Dec. 2, 1930.                M. NYSTROM                1,783,926
                              DIAPHRAGM
                       Original Filed July 2, 1926

INVENTOR
BY MARTIN NYSTROM
James P. Shea
ATTORNEY

Patented Dec. 2, 1930

1,783,926

UNITED STATES PATENT OFFICE

MARTIN NYSTROM, OF CHICAGO, ILLINOIS, ASSIGNOR, BY MESNE ASSIGNMENTS, TO UNITED RESEARCH CORPORATION, OF LONG ISLAND CITY, NEW YORK, A CORPORATION OF DELAWARE

DIAPHRAGM

Application filed July 2, 1926, Serial No. 120,160. Renewed October 7, 1930.

My invention relates to diaphragms and has a special relation to diaphragms for use in sound boxes of phonographs.

One object of the invention is to provide a strong and durable joint for securing a piston portion of a metallic diaphragm to a thin hinge portion.

Another object of the invention is to provide a novel welding method for securing the mentioned diaphragm portions together.

Other objects and advantages will appear as the description proceeds.

Referring to the accompanying drawings.

Figure 1:
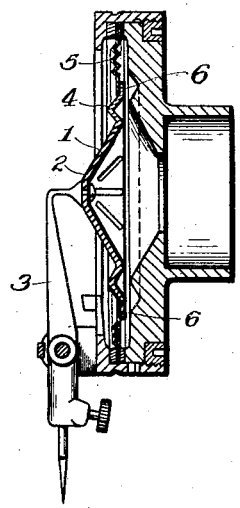
Fig. 1 is a central sectional view of a sound box having a diaphragm embodying the invention.

The diaphragm comprises a piston and a hinge on which the piston is mounted to vibrate. The piston may be deformed to render it inflexible so that it may have a true piston action and the deformation may be in the shape of a cone 1 which may be slightly flattened at the apex 2 where it may be secured to a stylus bar 3. To enlarge the area of the piston it may be provided also with an additional annular deformation 4.

The piston is made extremely thin to render it light and sensitive to vibration but the hinge is made still thinner to facilitate its flexure. The hinge may also be deformed to increase its flexibility and the deformations may be in the shape of annular corrugations 5.

The hinge has a central opening therein which is closed by said piston, the parts being in overlapped relation. The piston may have an outwardly extending flange 6 lying along the face of the hinge. The overlapped portions are welded together and the welding may occur at spots 7 spaced slightly apart in such wise as to render the connection secure and durable.

The piston and the hinge may be composed of a light metal such as aluminum or an aluminum alloy.

Diaphragms in which the piston was approximately .004" in thickness and the hinge approximately .002" in thickness have been found very satisfactory in operation.

Figures 2, 3:
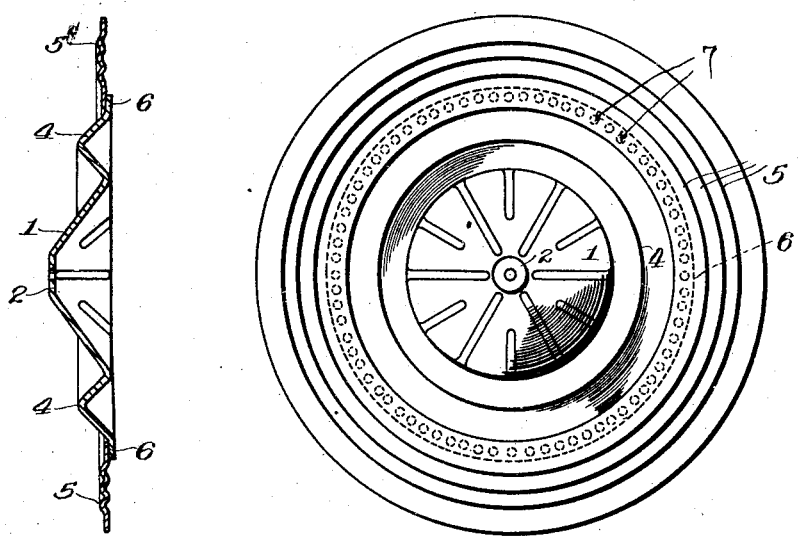
Fig. 2 is a central sectional view on an enlarged scale of the diaphragm in the sound box of Fig. 1.
Fig. 3 is an elevational view of the outer side of the diaphragm shown in Fig. 2.

In making the diaphragm the piston and the hinge may be separately shaped between dies and the parts may be then assembled to the position illustrated in Figures 2 and 3, after which the parts may be welded together at the spots.

The invention is not limited to the particular details of the embodiment illustrated and described. For instance the deformations 4 and 5 may be greatly varied in shape and number, the piston area may be greatly reduced and the hinge may be widened. The diaphragm may be used in loud speakers, telephones, sound boxes, and other devices. A substantial range of equivalents is contemplated within the scope of the appended claims.

I claim:

1. A diaphragm comprising an outer flexible metallic member having an opening therein and an inner rigid metallic member closing said opening and welded to said outer member.

2. A diaphragm comprising an outer flexible member having an opening therein and an inner rigid member closing said opening and spot-welded to said outer member, said members being composed of a light metal such as aluminum.

3. A diaphragm comprising an outer flexible member having an opening therein and an inner rigid member closing said opening and welded to said outer member at spots spaced a short distance apart, said members being extremely thin and composed of a light metal such as aluminum.

4. A diaphragm comprising an outer flexible member approximately .002" in thickness and having an opening therein and an inner rigid member approximately .004" in thickness closing said opening and spot-welded to said outer member, said members being composed of a light metal such as aluminum.

5. A diaphragm comprising an annular hinge deformed to facilitate flexure thereof and an inner piston deformed to prevent flexure thereof closing the opening in said hinge and welded to said hinge, said hinge and piston being extremely thin and composed of a light metal such as aluminum.

6. The method of making a metallic diaphragm having an inner piston and an outer flexible annulus which consists in welding the piston to the annulus along overlapping edges of the two members.

7. The method of making a metallic diaphragm which consists in deforming a member to render it rigid, assembling it over the opening of a flexible annulus and welding it to the same.

8. The method of making a metallic diaphragm which consists in deforming a member to render it rigid, deforming a flexible annulus to increase its flexibility, positioning the member on said annulus so as to overlie the opening therein and welding together the meeting portions of said member and said annulus.

9. The method of making a metal diaphragm which consists in welding a rigid member to a flexible annulus at points spaced slightly apart along the inner edge of said annulus.

MARTIN NYSTROM.